United States Patent
Colmenares

(10) Patent No.: US 12,416,250 B1
(45) Date of Patent: *Sep. 16, 2025

(54) SODIUM-CHLORINE BOILER

(71) Applicant: Teratech International Inc., Panama (PA)

(72) Inventor: Hafid Enrique Colmenares, Barcelona (ES)

(73) Assignee: Teratech International, Inc. (PA)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,978

(22) Filed: Oct. 15, 2024

Related U.S. Application Data

(63) Continuation-in-part of application No. 18/600,578, filed on Mar. 8, 2024, now Pat. No. 12,152,507.

(60) Provisional application No. 63/450,940, filed on Mar. 8, 2023.

(51) Int. Cl.
*F01K 7/30* (2006.01)
*F02C 3/20* (2006.01)
*F22B 1/02* (2006.01)
*F22B 7/04* (2006.01)

(52) U.S. Cl.
CPC ............... *F01K 7/30* (2013.01); *F02C 3/20* (2013.01); *F22B 1/02* (2013.01); *F22B 7/04* (2013.01)

(58) Field of Classification Search
CPC ...... F01K 7/30; F02C 3/20; F02C 3/24; F02C 3/26; F02C 3/30; F22B 7/04; F22B 7/06; F22B 7/08
See application file for complete search history.

(56) References Cited

U.S. PATENT DOCUMENTS

| | | | | |
|---|---|---|---|---|
| 4,799,357 A | * | 1/1989 | Hanrahan | F01K 3/188 423/500 |
| 2007/0224109 A1 | * | 9/2007 | Chaifetz | C01G 49/10 422/198 |
| 2012/0122017 A1 | * | 5/2012 | Mills | G21B 3/00 429/218.2 |

* cited by examiner

*Primary Examiner* — Andrew H Nguyen
(74) *Attorney, Agent, or Firm* — Greg M. Popowitz; Assouline & Berlowe, P.A

(57) ABSTRACT

A sodium-chlorine generator generates electricity. Chlorine gas is combined with sodium metal in a boiler. The reaction is exothermic and generates sodium chloride as a biproduct. The heat can be used to boil water to generate steam. The steam generated can be used to turn a turbine, which produces electricity. The reactor can use a heat exchanger to connect a boiler that is separated from reactor. The rate and output of the reaction can be changed by pressurizing the chlorine gas with the reactor and by preheating the sodium before the reaction. The sodium chloride can be recycled to generate sodium metal and chlorine gas for a subsequent use.

10 Claims, 14 Drawing Sheets

SODIUM-CHLORINE BOILER

CROSS-REFERENCE TO RELATED APPLICATIONS

This is a continuation-in-part application of application Ser. No. 18/600,578, filed Mar. 8, 2024, which claims the benefit of U.S. Provisional Application No. 63/450,940, filed Mar. 8, 2023, both of which are hereby incorporated by reference.

FIELD OF THE INVENTION

The invention broadly relates to sodium chloride boilers that produce clean energy without greenhouse gas emissions.

BACKGROUND OF THE INVENTION

Current coal and hydrocarbon-based steam generating boilers emit carbon dioxide emissions, i.e., greenhouse gas emissions, which harm the environment. Hydrogen based direct combustion with oxygen in boilers creates significant energy, but also generates nitrous oxide, another greenhouse gas. Hydrogen reactions are also not efficient due to high energy consumption during manufacture and storage. The use of fossil fuels to generate heat/energy in boilers is the standard in today's state of the art, which is the primary contributor to greenhouse gas emissions.

As can be derived from the variety of devices and methods directed at generating energy in boilers, many means have been contemplated to accomplish the desired end, i.e., fossil fuels, steam, and hydrogen. Heretofore, tradeoffs between greenhouse gas emissions, energy storage, and efficiency were required. Thus, there is a long-felt need for a combustion system in boilers that is more efficient. There is a further long-felt need for a boiler combustion system that does not produce greenhouse gases.

BRIEF SUMMARY OF THE INVENTION

The present invention broadly comprises a combustion system in boilers through the reaction of sodium metal and chlorine gas.

In a further embodiment, the sodium boiler includes an atmospheric system.

In a further embodiment, the sodium boiler includes an indirect heat transfer system.

In a further embodiment, the sodium boiler includes a pressurized system.

A further object of the invention is to provide a sodium-chlorine boiler for generating electricity that does not require a return heat transfer component. The sodium-chlorine boiler includes a chlorine supply providing chlorine, a sodium metal supply providing sodium metal, a water supply providing water and a combustion chamber. The combustion chamber receives the chlorine from the chlorine supply, the sodium metal from the sodium metal supply, and the water from the water supply. The chlorine, the sodium metal, and the water combine in a hypergolic reaction in the combustion chamber. The reaction yields heat, steam, and sodium chloride. A turbine is connected downstream from the combustion chamber. The turbine is turned by the steam from the combustion chamber.

The sodium chlorine boiler not having a return can include a cyclonic separator, preferably with a zenithal shot, disposed downstream of the turbine. The cyclonic separator can separate the sodium chloride from the steam.

The sodium chlorine boiler can include a diffuser disposed between the turbine and the cyclonic separator.

In the sodium-chlorine boiler without a return, the combustion chamber and the turbine can be coaxial.

In the sodium-chlorine boiler without a return, the combustion chamber can have a convergent divergent nozzle for releasing the steam and sodium chloride from the combustion chamber. The nozzle can be configured to superheat the steam to at least five hundred degrees Celsius when passing through the nozzle. The nozzle can be configured to pressurize the steam in the combustion chamber to at least forty atmospheres and no more than sixty atmospheres when the reaction is normally occurring.

In accordance with the objects of the invention, the chlorine supply can include a cryogenic pump. The cryogenic pump holds the chlorine as a liquid in the chlorine supply.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures.

DETAILED DESCRIPTION OF THE INVENTION

Figure 1:
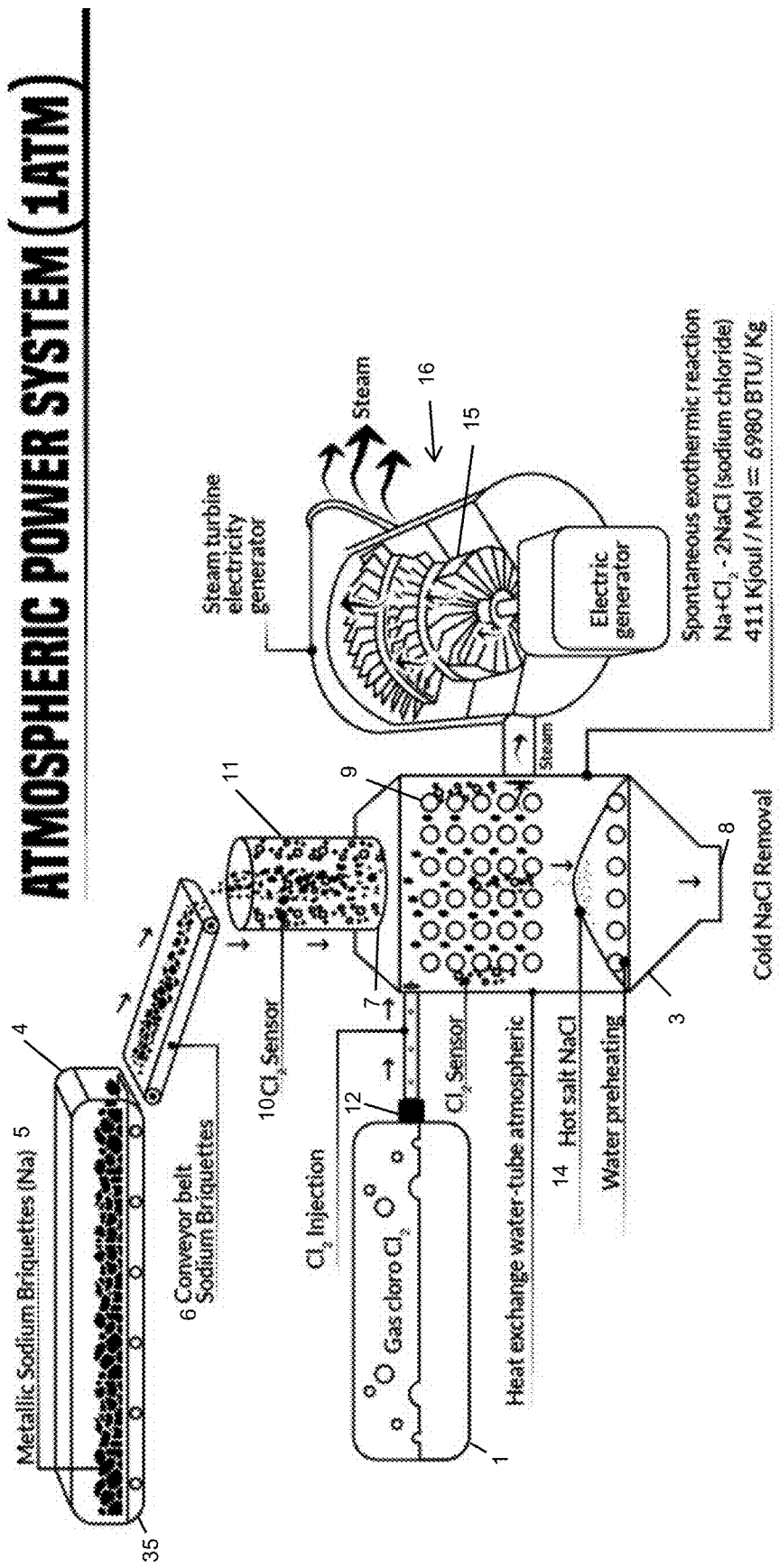
FIG. 1 is a schematic view of an atmospheric power system using a sodium-chlorine boiler according to the invention.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "boiler" is synonymous with terms such as "cistern," "tank," "reservoir," etc., and such terms may be used interchangeably as appearing in the specification and claims. Although any methods, devices, or materials similar or equivalent to those described herein can be used in the practice or testing of the invention, the preferred methods, devices, and materials are now described.

Adverting now to the figures, FIG. 1-5 show the applications of sodium boilers for the generation of steam, which provides mechanical work to generate electricity without the emission of greenhouse gases. The configuration of each boiler depends on each of the specific needs and desired output of the system. The boiler can be included into multiple system configurations, including but not limited to: atmospheric systems and aquotubular systems (both direct and indirect heat transfer systems through a fluid).

The sodium boiler becomes the center of the green energy cycle based on sodium chloride. Sodium chloride permits a closed cycle chain to transmit and store energy from renewable sources or from different sources such as nuclear, hydrocarbons, and other reversible processes based on potassium, iron, aluminum, sulfur, or cobalt. Using a controlled atmospheric process does not allow the entry of air or any other gas or environmental fluid to alter the cleanliness of combustion. Without controlled atmospheric conditions, the combustion of hydrogen and air will cause the hydrogen to react with oxygen and atmospheric nitrogen to form nitrous oxide, which is dangerous due to their combustion at high temperatures. Such an output is a source of undesirable molecules for the environment. Hydrogen will react with atmospheric air to create nitrous oxide, which is undesirable. High temperature is defined as temperatures exceeding two hundred degrees Celsius (>200° C.), but will vary based on elevation. This configuration with hydrogen is difficult to use with smaller boilers and engines because the reaction can be extremely poisonous in closed environments.

General Process

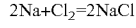

Molecular Weight NaCl=58.44 g/mol=17.11 mol/kg
Faraday's constant=96485.33 cal/mol
Molecular Weight×Faraday's Constant=17.11 mol/kg× 96485.33 cal/mol=1651 kcal/kg
Caloric value per ton of mixture=1651 kcal=4.1868 kJ 6912.51 KJ/t.

The result is the working energy produced by one tonne of sodium-chlorine mixture without greenhouse gas emissions.

Atmospheric Power System

FIG. 1 shows a preferred embodiment of an atmospheric power system.

For an atmospheric power system, chlorine gas 1 is at ambient pressure of one atmosphere, which reduces risk in larger boilers from reduced control in the reaction speed of the sodium-chlorine combustion process. An atmospheric pressure process allows for easier discharge of sodium chloride residue without interrupting the chlorine gas pressure.

The atmospheric sodium-chlorine boiler system has a constant pressure within one atmosphere (≤1 atm) or the equivalent of ambient atmospheric pressure, depending on the height above sea level where the system is located. Chlorine gas, due to its condition and molecular weight, remains in the lower part of the boiler body 2, acting as a receiving element that is omnipresent throughout the combustion chamber 3.

Structure of the Atmospheric System

Sodium Preheater 4. The sodium preheater 4 (which is also referred to as a preheating container and sodium preheater) container is made of non-reactive and waterproof material, in which the temperature of the metallic sodium briquettes 5 is raised to temperatures below eighty degrees Celsius (<80° C.) in order to bring the metal closer to its activation temperature without reaching the point merge to avoid change of state.

The preheating container 4, through a conveyor belt 6 fed by a helical feed screw in the lower part of the container, is in charge of feeding the boiler at the working speed required by the caloric needs of the system, taking into account that on average 1,950 Kw are produced from one (1) ton sodium-chlorine mixture with an expected energy efficiency of 70% for a thermal system without gas emission, the system will obtain a net production of 1,365 Kw per ton of mixture.

Combustion Chamber of the Boiler (Reaction and Heat Exchange):

The combustion chamber 3 of the boiler 2 will be made up of materials with the following features:

Resistance to high temperatures, up to 1,000° C., without loss of structure;
Resistance for long periods to chlorine-sodium corrosion;
Non-reactive with metallic sodium, absence of hydrogenated chains associated with oxygen;
High heat transfer rate; and
Mechanical properties and coefficients of plasticity and elasticity that provide resistance to expansion due to sudden changes in temperature.

Structural Configuration of the Combustion Chamber of the Atmospheric Boiler:

The structure of the combustion chamber 3 of the atmospheric boiler is based on verticality, i.e., the distance between the metallic sodium inlet 7 with respect to the sodium discharge nozzle 8. The reaction time determines the passage of the reagent in a certain time to exchange heat in the framework of the water tube ducts 9. A vertical structure in the form of a diamond, inverted cone, and rhombus, favors the relationship between reaction time and mass concentration at the central point of the boiler furnace to ensure that the reagents remain in contact with the ducts for a longer time in the longest period of the reaction. This relationship maintains stable temperatures of critical and super critical steam in the system.

The amount of chlorine gas in the combustion chamber 3 will be maintained by measuring with a sensor 10 in a probe chimney 11, which controls the opening and of the sodium chloride discharge nozzle 8, which regulates the entry of chlorine gas to the home, to avoid losses due to filtering in the nozzle, through the sodium chloride in the discharge of each batch.

Configuration of the Water-Tube Ducts Framework

Passive Framework. The water-tube ducts 9 framework is installed in combustion chamber 3, which has lower heat disposal needs, and includes water tube ducts at forty-five degrees (45°) with respect to the vertical axis and in sections perpendicular to each other, to control descent of the hot reagent, the figure geometry of each exterior conduit varies according to the volume of the mass and the optimal time in its passage through the home; the square, hexagonal and octagonal sections slow down the passage of the mass in reaction, and the triangular, round and rhomboid sections, in the cross section of the ducts, accelerate the passage of the mass.

For a boiler furnace with a higher volumetric capacity and a shorter vertical passage distance for the reactive mass, the angles of the water tube ducts with respect to the horizontal plane are reduced.

The path of the conductive and expanding fluid (in this embodiment, water) must start with a preheating phase at the inlets near the lower of the boiler through the heat exchange piping system through the lower discharge nozzle 8 and metallic sodium inlet 7. Then, in a return, the ducts approach the center of the combustion chamber to raise the temperature of the water vapor to critical and super critical conditions, to carry out mechanical work in contact with the blades of a turbine.

Sodium Chloride Discharge Nozzle 8. The final section of the passage of the reactive mass is called the tail. The tail's structural configuration is in the shape of an inverted cone to concentrate the residue in a wedge shape and thus create a clogging due to accumulation in the glue that prevents chlorine gas losses at the nozzle outlet 8.

The sodium chloride outlet 8 has two mechanisms for discharge, an endless screw mechanism, which is arranged horizontally to ensure the continuous discharge of sodium chloride to a water preheating chamber and residual chlorine gas recovery.

Single Gravity Gate Mechanism. This single gravity gate mechanism empties the bottom of the boiler in a single opening movement towards the secondary preheating chamber. The single gravity gate mechanism is the ideal system for single batch, pressurized, and shutdown configurations.

Secondary Chamber System or Preheating. The secondary chamber allows receiving discharges of sodium chloride for its storage. The secondary chamber's use of residual heat allows the unlinking of chlorine gas waste for its reuse and compression. The secondary chamber's unloading is oriented to a conveyor belt for mobilization to a Downs cell or warehouse waiting for its reuse.

Pumping Systems. The primary pumping system includes a high-pressure pump. The primary pumping system can maintain working pressures higher than the pressure of the expansion of the steam leaving the boiler. The primary pumping system connects and pumps the fluid (water) from the turbine return condenser tank.

Volumetric Calculation of Combustion Chamber of the Boiler

The effective volume inside the combustion chamber will determine the maximum potential heat input in a given period of time, estimating one cubic meter ($\sim 1$ $m^3$) of free volume (not including water tube ducts) and with a reactive mass occupancy percentage of fifty percent (50%) to avoid retention. By cumulative structures of sodium chloride, the invention obtains a working volume of five tenths of a cubic meter (0.5 $m^3$) of reactive mass for each cubic meter of boiler furnace. Therefore, with a density of two and sixteen hundredths grams per cubic centimeter (2.16 $g/cm^3$) the final equivalence is 500 l×2.16=1,080 kg equivalent in reaction heat tables, where one kilogram (1 kg) of chlorine-sodium mass gives off 1.9 kw×1,080 kg=2,052 $kw/m^3$ (combustion chamber).

The invention projects an average reaction time per batch of 60 seconds, which will result in a theoretical yield per hour of 2,052 $Kw/m^3$ (combustion chamber)×60 min=123,120 $kwh/m^3$ (combustion chamber).

Activation Energy

The energy required for the first impulse to trigger the reaction is slightly higher than two-hundred degrees Celsius (>200° C.) depending on the environment, but once the primary reaction has started, the thermal embryo continues the process since the boiler itself is the ignition drive. To initialize ignitions there is a waiting time in the preheating process of the metallic sodium until the first aggregate exceeds the spontaneous ignition temperature.

Auxiliary System

In cases where there is no availability of an initial electric preheater, there will be a very low volume water injector and a single impulse to cause the initial reaction temperature as a water striker when it contacts the metallic sodium, just at the time of injection at the combustion chamber.

Indirect Heat Transmission System

Figure 2:
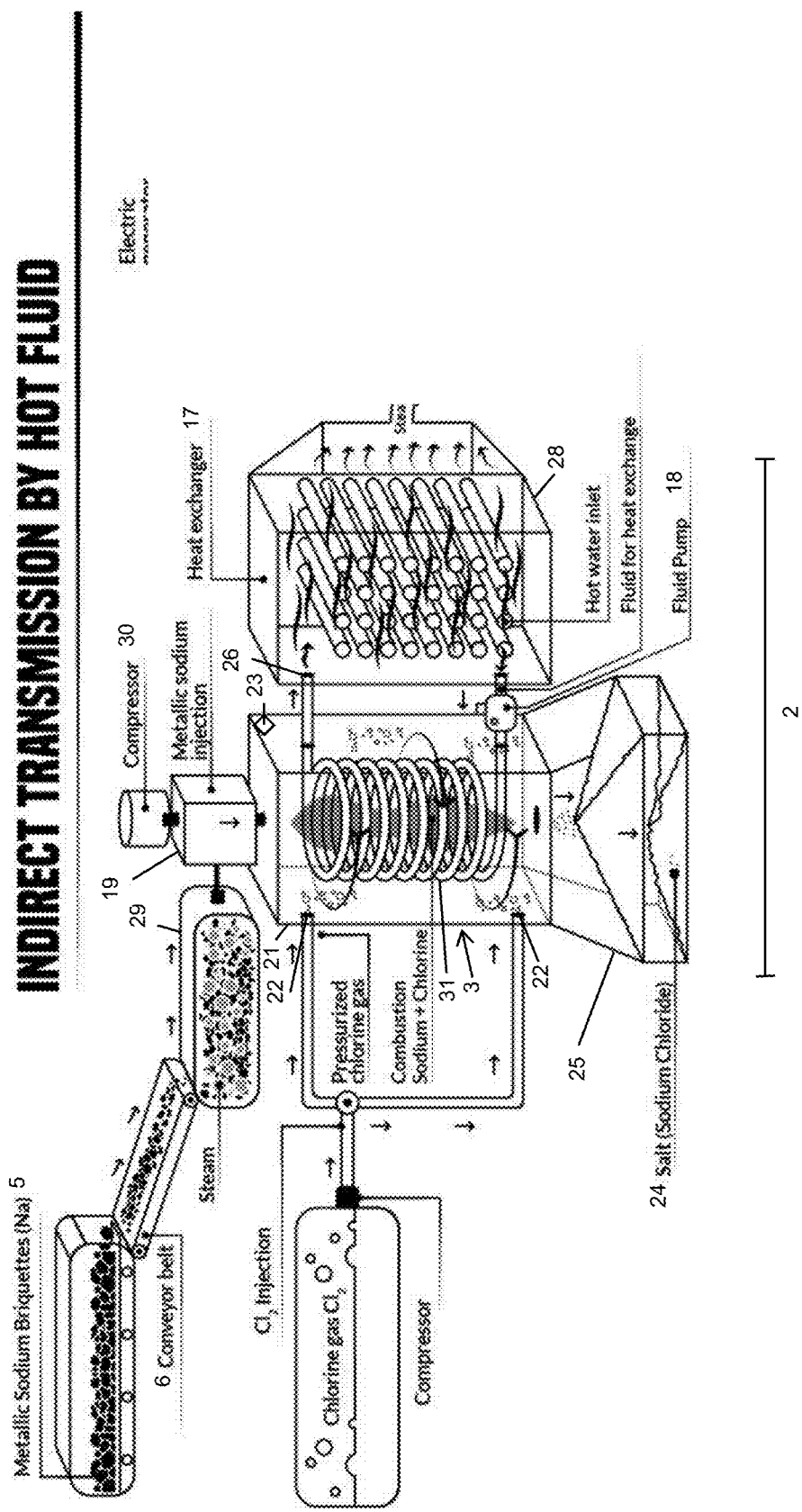
FIG. 2 is a schematic view of indirect transmission by hot fluid using the sodium-chlorine boiler shown in FIG. 1.

FIG. 2 shows a preferred embodiment of an indirect heat transmission system.

The installation of the indirect heat transmission system requires the adaptation of a parallel container with heat conducting fluid to replace the water in the water tube ducts, the fluid will proceed to circulate between the combustion chamber 3 and the parallel heat exchanger 17, which together form the boiler 2. To provide a safety margin in the event of any rupture of the water tube duct, the pump 18 to drive the fluid will modulate the exchange rate according to the energy needs of each system.

First, metallic sodium briquettes (Na) are loaded into the system using a conveyor belt 6. The sodium briquettes 5 are deposited into an upper chamber 19 of the boiler 2. The upper chamber also contains a chlorine sensor 20. Under the upper chamber, the main chamber 21 is located. The upper part of the main chamber 21 includes a chlorine injection port 22 and a chlorine sensor 23. Chlorine gas is input into the main chamber 21 through the chlorine injector port 22.

When the chlorine gas mixes with the sodium briquettes, a chemical reaction occurs. The reaction produces steam, and hot sodium chloride (i.e., salt). The hot sodium chloride 24 deposits at the bottom of the main chamber 21 onto preheated water. Once the sodium chloride 24 cools, it flows into the lower chamber 25, underneath the main chamber 21, and removed from the system.

The output of steam is routed through the steam output port 26 and into a steam turbine 16. The flow of the steam into and then out of the steam turbine 16 causes the blades 15 (which are also referred to as baffles) of the turbine 16 to rotate and create electricity. An electric generator 27 converts mechanical work into electrical energy.

The combination of sodium and chlorine produces sodium chloride in a spontaneous exothermic reaction, which results in 411 kj/Mole or 6,980 BTU/kg of electrical power.

Indirect Heat Transfer System

For an indirect heat transfer system, the combustion of sodium chlorine is performed in a water-tube configuration with internal circulation of a fluid (other than water), for the transmission of heat to a heat exchange vat 28. The heat exchange vat 28 is also provided with a tubular heat exchange system for the passage of water with the intention of converting it into steam. This system ensures that the reaction will not have any contact with water from the boiler if a failure occurred.

Process Flow

First, the sodium briquettes become liquid in the preheater and reach the chamber that contains argon gas, which once loaded with liquid sodium is pressurized and injected into the chamber.

Second, chlorine gas is compressed into pressured lines and the pressurized chlorine gas is input into the main chamber 21 using two inlet ports 22 on the side of the main chamber 21. One port 22 near the top of the main chamber, and one port 22 near the bottom of the main chamber 21. The main chamber 21 includes a cylindrical piping system where fluid is pumped through the piping 31 in the main chamber 21 to facilitate the heat exchange process.

When both the compressed metallic sodium gas and the pressurized chlorine have entered the main chamber, combustion occurs. The byproduct of the reaction is sodium chloride (i.e., salt), which is deposited at the bottom of the main chamber into a lower chamber.

The main body of the piping 31 is housed within the main chamber 21. The two ends of the piping are connected to a heat exchanger 17. The fluid pump 18 sits between the heat exchanger 17 and the main chamber 21. The fluid/gas is routed into the heat exchanger 17. How water is routed into the heat exchanger 17 and after reacting with the gas, steam is generated.

Returning water to the auxiliary station 32 provides for the physical separation of the heat exchanger 17. Water should not mix with the sodium, which could result in a negative reaction. This creates a "firewall" (i.e., a physical separation) between the two chemical reactions. The two different chambers reduce risk of a negative chemical reaction.

The output of steam is routed through the steam output port 26 of the heat exchanger and into a turbine 16. The flow of the steam into and then out of the steam turbine 16 causes the blades 15 of the turbine to rotate and create electricity. An electric generator 27 stores the electricity generated from the steam.

Pressurized Cycle System

Figure 3:
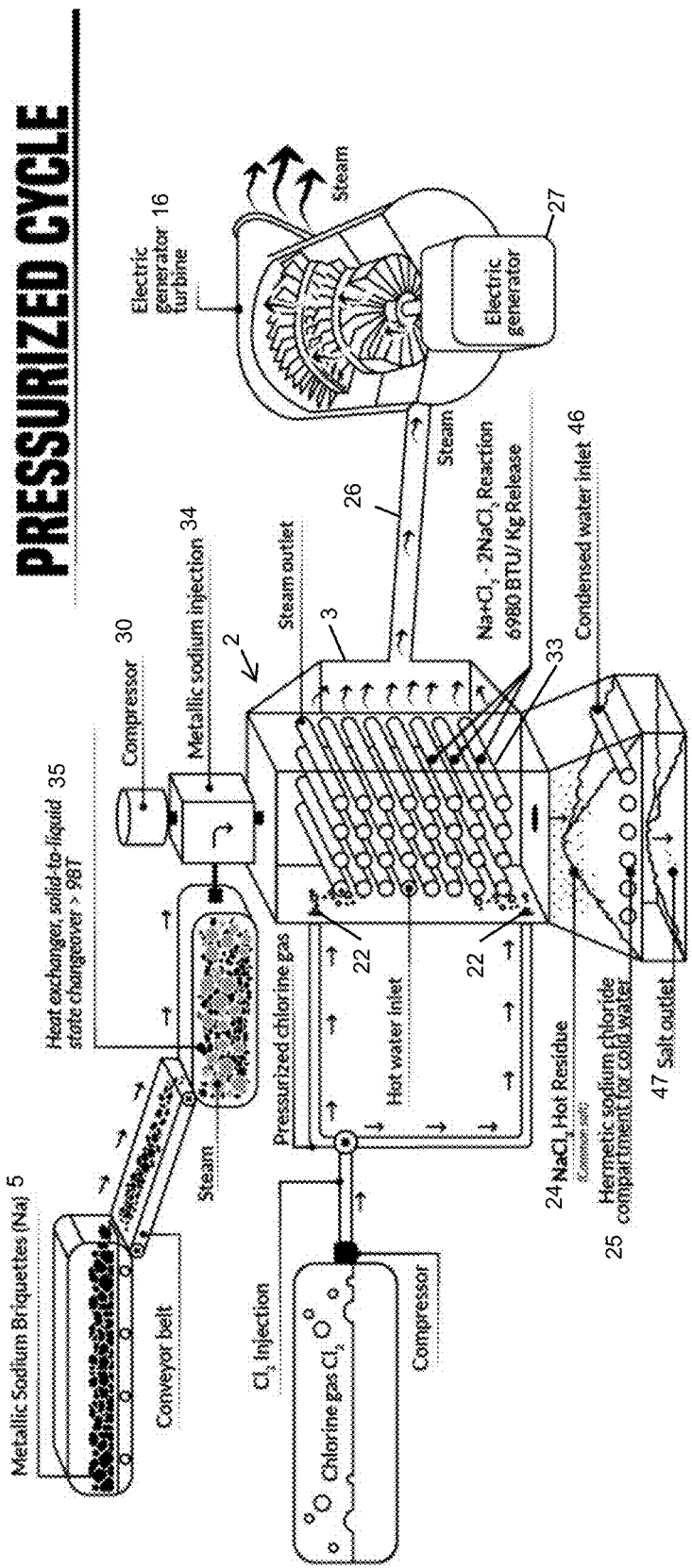
FIG. 3 is a schematic view of a pressurized cycle using the sodium-chlorine boiler shown in FIG. 1.

FIG. 3 shows a preferred embodiment of a pressurized cycle system.

For a pressurized cycle system, the boiler 2 includes injection of sodium in either a liquid or solid state, in the form of pellets or briquettes 5 into the boiler 2. The boiler 2 contains the pressurized chlorine gas to improve the efficiency of the chemical reaction. This system includes an initial phase of metallic sodium injection in a liquid state to provide the initial heat that will trigger the reaction.

The result of this reaction is the generation of heat energy for the production of energy and the production of common salt, which according to the internal configuration of each boiler will fall by gravity once its reaction time is completed with a rate of passage that is determined by the inclination angles and vibrating and tumbling elements of each boiler. The sodium chloride obtained and accumulated in the bottom of the main chamber is extracted by filling a hopper with the discharge or by using a worm screw.

The pressurized sodium-chlorine boiler system includes a hermetic body 32 where chlorine gas is maintained at working pressures greater than one atmosphere (>1 atm). Pressurization is due to the need to increase the initial temperature, increase the availability of chlorine gas to positively influence the speed of the reaction and the time required to reach super critical heat temperatures.

The internal pipes 33 of the boiler where combustion and heat exchange take place have an incline of more than 45° with respect to the vertical axis and a cross-linking supported by an active vibration system that prevents accumulations of residual sodium chloride.

The injection of sodium into the pressurized system is conducted from a thermal chamber 35 where the sodium is maintained at temperatures above the melting point.

The structural configuration of the pressurized system includes the same original features of the atmospheric system with the following accessory elements.

Injection 34. The injection 34 of metallic sodium will be carried out in liquid form by means of an endless screw in a chamber 35 with controlled heat to keep the fluid sodium in a liquid state and with constant pressure of inert gas in the upper part 36 of the injector 34 to maintain the pressure balance between the injection chamber 37 and the boiler 38.

The discharge nozzle. The nozzle 8 does not include a continuous sodium chloride discharge system, to avoid chlorine gas losses, only the direct gate discharge system is maintained for each batch.

The chlorine gas pressure. The chlorine gas pressure will be constant above one atmosphere (>1 atm) and according to the resistance limits of the boiler materials, and the degree of tightness of the inlet injector 22 and in the outlet gate 39 a pressure switch 40 connected to the intake valve 22 will be the responsible for regulating the flow.

Active water-tube framework. In the active framework variant, the invention includes a vibration system by eccentric plunger 41 and suspension of the boiler on springs 42 to cause a micro vibration in case of sodium chloride accumulation between the water-tube ducts. This mechanism is activated by a pressure sensor weight 43 in the discharge gate 44, which by not receiving the expected residue activates the vibrating plunger 41.

Process

First, metallic sodium briquettes (Na) 5 are loaded into the system using a conveyor belt 6. The sodium briquettes 5 are mixed with steam in a thermal chamber 35. The metallic sodium gas is routed to an upper chamber and forced into the top of the main chamber 3 using a compressor 30.

Second, chlorine gas is compressed into pressured lines and the pressurized chlorine gas is input into the main chamber 3 using two inlet ports 22 on the side of the main chamber 3. One port 22 near the top of the main chamber 3, and one port 22 near the bottom of the main chamber 3. The main chamber 3 includes a cylindrical piping system 33 where fluid is pumped through the piping in the main chamber 3 to facilitate the heat exchange process.

When both the compressed metallic sodium and the pressurized chlorine have entered the main chamber 3, combustion occurs. The byproduct of the reaction is sodium chloride hot residue 24 (i.e., salt), which is deposited at the bottom of the main chamber 3 into a lower chamber 25, which is also referred to as a hermetic chamber in this embodiment. In the lower chamber 25, there is a hermetically sealed sodium chloride compartment 32. A condensed water inlet 46 is fed into the lower chamber 25. After the hot sodium chloride residue 24 exchanges its heat (or passes by) the cold water, salt is routed out of the salt outlet 47.

The output of steam is routed through the steam output port 26 of the heat exchanger and into a turbine 16. The flow of the steam into and then out of the steam turbine 16 causes the blades 15 of the turbine 16 to rotate and create electricity. An electric generator 27 stores the electricity generated from the steam.

Sodium Metal and Chlorine Gas Model

Figure 4:
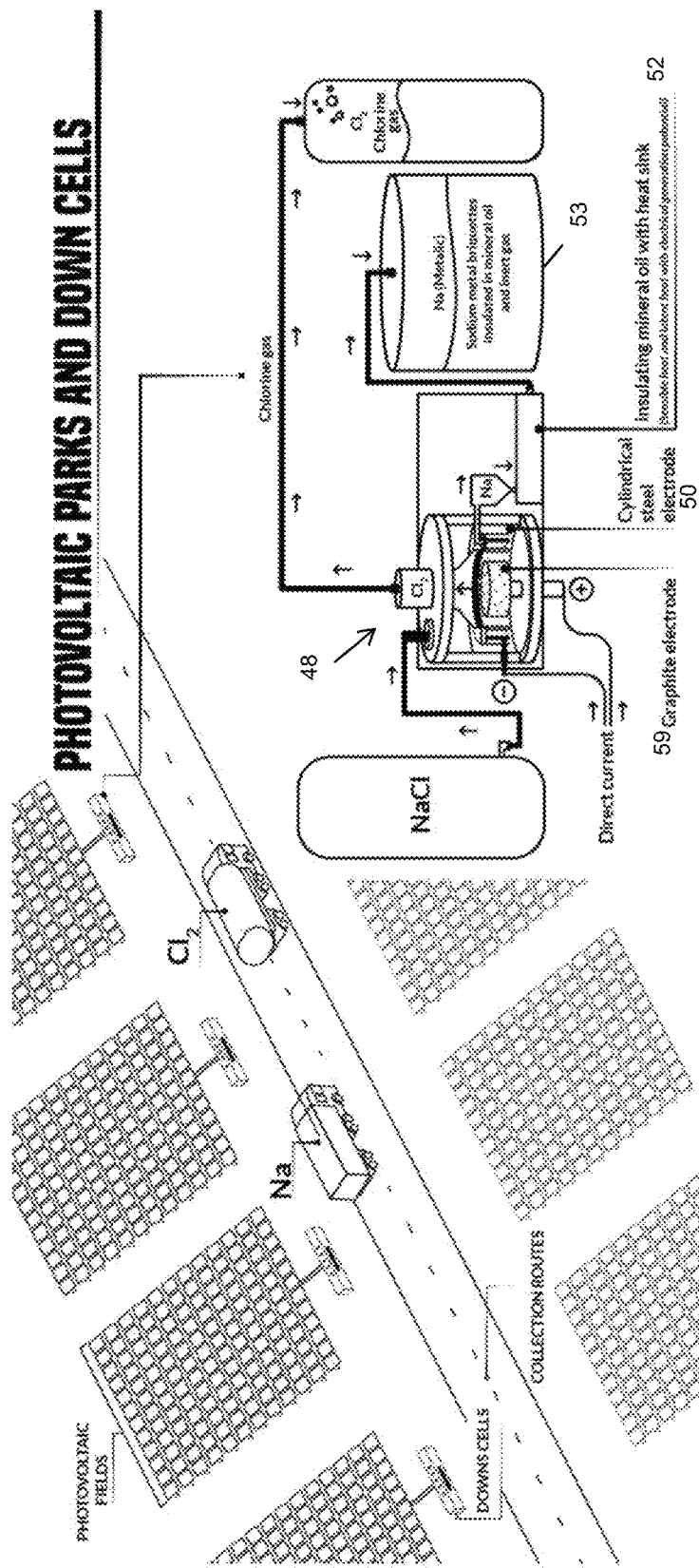
FIG. 4 is a schematic view of photovoltaic and Downs cells using the sodium-chlorine boiler shown in FIG. 1.
Figure 5:
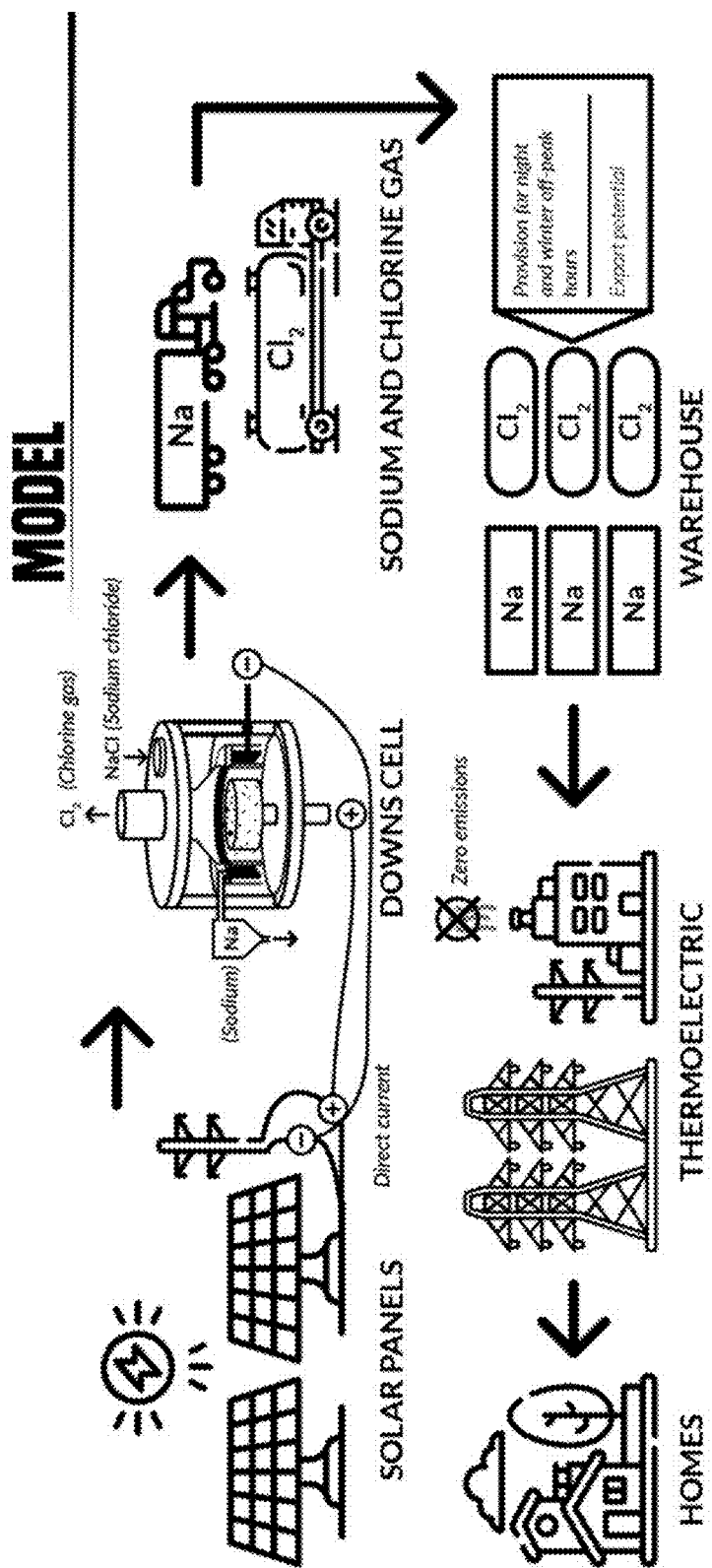
FIG. 5 is a general process flow model using the sodium-chlorine boiler shown in FIG. 1.

FIG. 4 shows a system for converting sodium chloride (NaCl) to solid sodium ($Na_{(s)}$) and chlorine gas ($Cl_{2(g)}$).

Sodium metal and chlorine gas are obtained through the electrolysis process of sodium chloride in Downs cells using available clean energies. These elements have already proven storage technologies for long time periods, which provides the sodium chlorine boiler a capacity to meet the demand at peak consumption and in areas without access to clean energy.

The result of the sodium chlorine combustion in boilers is sodium chloride (i.e., common salt) which closes the cycle of the process by being able to recycle the salt in the electrolysis of the Downs cell 48 with the separated elements sodium metallic and chlorine gas will be obtained again to restart the cycle.

The sodium chloride reacts with a graphite electrode 49 and cylindrical steel electrode 50. The result is the output of chlorine gas and sodium. The chlorine gas outputs into a chlorine gas reserve tank 51. The sodium passes by an insulating mineral oil with heat sink 52 and is then deposited into a sodium tank 53 in the form of sodium briquettes in mineral oil and inert gas.

The system of using the sodium chloride vector as a vehicle for energy transmission and storage is based on the principle of non-emission of greenhouse gases. This system can convert sodium chloride (common salt) into two different elements (metallic sodium) and (chlorine gas) through a Downs type cell. This is a clean energy process.

The Downs cell receives electricity in direct current, the products of the electrolysis process are cooled (in the case of sodium) and this heat can be used as potential energy for the compression of chlorine gas. The chlorine gas can be stored in a compressed state or injected into a chlorine pipeline directly. Storage times can be long and safe because there are mature technologies for these two elements in their pure state. The use in combustion is determined by several factors, the mixture must be stoichiometrically accurate when calculating its injection into the boiler furnace, its initial reaction temperature must be nominal and will be calculated taking into account the working pressure of the chlorine gas, its reaction time will determine the volumetric capacities of the boiler with respect to the heat requirement for power generation or heat transfer, the handling of the residual salt will always be done with heat exchange elements that allow it to act as fluid preheating, the return of the residual salt to the Downs cells ensures a closed loop process in terms of physical elements and also ensures the purity of the recirculation salt since no more salt will have to be added than the small losses due to handling.

The invention can be used to: 1) operate thermoelectric plants without emission of polluting gases; 2) combine sodium and chlorine for a reaction that creates steam as a source of mechanical energy that operates turbines for electric generation; 3) operation of water-tube boilers for industrial and residential use; 4) heat generation for heating by means of heat exchange systems of residential and industrial transmission fluids; and 5) energy storage systems, energy reserves, strategic reserves, winter reserves, commercial reserves, raw materials, future funds, and investment funds.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Sodium-Chlorine Cyclone Boiler Configuration

The configuration of the cyclone-type sodium-chlorine boiler offers high efficiency in heat exchange speed, solid waste recovery (sodium chloride), reaction control, and reaction speed, all based on the use of the heat of formation of sodium chloride from gaseous chlorine and metallic sodium.

The main features of the boiler include the absence of waste gases, the use of two reactants as energy vectors with the possibility of long-term storage, making it ideal for seasonal storage. The closed pressurized system controls the reaction uniformly, and the recirculation of reaction gas through a turbine accelerates the circulation of reacting material.

The system's residue is solely sodium chloride, which can be electrolyzed again (reversible reaction) to separate the two elements or used as raw material for various applications. Being a solid product at room temperature and environmentally benign gives unique qualities to the boiler.

It provides the option of using a fluid for heat exchange that allows the generation of heat and work through fluid state change processes for operating steam turbines or providing heat through radiation, convection, and contact with heating air.

Operation and Construction Criteria of the Boiler

This configuration operates at a constant pressure of chlorine gas, which is injected from a high-pressure container controlled by an intake valve. A pressure switch connected to a sensor maintains a constant pressure inside the boiler. A check valve is used to ensure the positive flow direction towards the boiler, preventing the entry of sodium residues into the chlorine gas duct.

The pressurized chlorine duct, from the container to its injection into the boiler, must have direct contact with the walls of the recirculation ducts to provide heat to the chlorine gas after ignition starts and prevent a drastic temperature drop during the expansion when chlorine pressure falls due to its injection into the recirculation ducts.

The pressure of chlorine gas in the combustion chamber is used as a supply criterion from the intake valve activated by the pressure switch.

The pressure switch has ranges between 101.32 kilopascals and 202.65 kilopascals. The minimum range ensures chlorine gas supply above atmospheric pressure, and the upper range ensures a safe working pressure, maintaining better ignition due to pressure increase. The upper limit facilitates maintaining sodium injection at higher pressure with relatively low pressures.

Enthalpy

Because the system stabilizes at constant pressure, the temperature is equal to the enthalpy change:

$\Delta °H = qp$.
$\Delta °H = -411$ kJ/mol
1000 g/PM=1000 g/58.45 g/mol=17.11 mol/kg
17.11 mol/kg*−411 kJ/mol=−7032 KJ/kg
$\Delta °H = -7032$ KJ/kg. p=constant Sodium Injection The injection configuration of the metal in the liquid state is applied to ensure uniformity in the inlet fluid and bring the metal closer to its spontaneous reaction temperature with gaseous chlorine. The operating temperature range of sodium should be above 98° C. to ensure fluidity (melting temperature) and below 350° C. to avoid the photoluminescent effects of gaseous sodium before reacting with chlorine gas.

The sodium containment vessel is made of ceramic and alumina (aluminum oxide) with a spiral electric resistor attached to the walls of the container. The electric resistor is calculated for operating pressure ranges of 500 kilopascals to 1 megapascal.

The electric resistor is adjusted to the sodium container's capacity, and following the heat transfer criterion per kilogram, the installed heat required per kilogram of sodium is calculated:

$$Q = m \cdot c \cdot \Delta°T$$

m=1 kg Na
c=1230 J/(K·kg) Na
ΔT=(623° K–253° K)
Q=1 kg*1230 J/(° K·kg)*370° K=455,100 J/kg

The sodium containment vessel's pressure must have a minimum range above 500 kilopascals to 1 megapascal controlled by a pressure switch connected to the argon gas pressure control solenoid valve to maintain constant pressure in the sodium injection flow.

The sodium outlet solenoid valve has a thermostat at the sodium injector's height, which opens the liquid metal passage only when the temperature exceeds 200° C. In case of higher chlorine gas pressure, the temperature can be reduced since the reaction temperature is adjusted to the chlorine gas's relative pressure.

The sodium container contains a pressure equalization lung duct for argon thrust gas to prevent overpressure or overthrust. Its dimensions are at least 10% of the container's volume and should be positioned between the argon supply and the top of the container. Argon gas is stored in a pressurized container.

The pressure control criterion is determined by the sodium injection range thermostat and the sodium supply, which serves as a criterion for closing its outlet valve.

The injector nozzle is impact with a central needle from the side to produce an open spray at low flow and low pressures. It is oriented towards the gas flow to favor the drag of particles.

Boiler Body

For the cyclone body, a Stairmand configuration of 5.5 vortices was chosen having the following properties:
- Carbon steel with a thermal conductivity coefficient (ct) of 25-47 Kcal*m/m²·h·° C.;
- Upper outlet recirculation and tangential inlet perpendicular to the cylinder; and
- Presence of fine particle separator between the upper cylinder outlet and the recirculation turbine.

The Leaping Velocity (VS):

In relation to the initial velocity of the working gas (chlorine gas), chlorine gas must comply with a mandatory ratio to avoid the recirculation of particles already trapped in the lower waste recovery:

$$Vi/Vs < 1.35$$

$$Vs = 4.913 * W * Kb^{0.4} * DC^{0.067} * \sqrt[3]{(vi^2)}$$

Velocity of chlorine gas entry (Vi): 15.2-27.4 meters/second.

$$Kb = b/DC$$

b=0.2*DC
Kb=0.2 m
W=equivalent velocity $$W = \sqrt[3]{(4*G*\mu*(Pp-P))} \div 3*P^2$$

Pp: density of sodium chloride: 2160 kg/m³
P: density of chlorine gas: 3.2 kg/m³
μ: viscosity of chlorine gas: 0.0132 mPa·s at 20° C.
G: 9.8 m/s²

Pressure Drop $$\Delta p = \frac{1}{2} * P \text{ chlorine gas} * Vi * Nh$$

ΔP must be less than <2488.16 Pascal
Nh: number of Stairmand configuration heads (nominal in tables)

Waste Recovery (Sodium Chloride):

In the lower cyclone container and lower discharge valve subject to system depressurization, the solid recovery container provides a large amount of residual heat and is utilized in both fluid and air heat exchange configurations.

The opening of the discharge valve is conditioned by the pressure switch since the pressure must be atmospheric to prevent chlorine gas leaks. Additionally, the entire residue is never discharged to allow the upper part to function as a seal.

Heat Exchange Surface

Basically, the entire body of the cyclone boiler is a heat exchange surface in contact with fluids in liquid and gaseous states to facilitate state changes and generate water vapor or use them as heat transport vectors in the case of high-boiling hydrocarbons or metals with melting points within the boiler's heat ranges.

The heat transmitted by conduction is proportional to the cross-sectional area, the temperature difference, time, and inversely proportional to the material thickness. We use Fourier's formula to calculate the amount of heat transmitted based on dimensions, time, and the thermal conductivity coefficient of the construction material. The equation for cylindrical shapes, where the amount of heat transmitted by conduction from the inside to the outside is expressed in the following equation for design calculations:

$$Q = 2\pi * L * Ct(t1-t2)/\log_e(r_e/r_i)$$

Q=heat transmitted amount
L=cylinder length
(t1–t2)=temperature difference of the segment
$r_i$=inner radius
$r_e$=outer radius
Ct=25-47 Kcal·m/m²·h·° C. in carbon steels
Ct=55 Kcal·m/m²·h·° C. in cast iron.

Gas Drying System

An indispensable accessory mandatory in the gas emptying process into the boiler, as the presence of water is dangerous inside due to its reaction with sodium, generating potentially explosive hydrogen. Drying will be done with a chemical dryer attached to the lateral entry of the cylinder. Silica gel and low-temperature dryers are also recommended for this purpose.

Fluid System Based on Water

The system contributes 411 KJ/kg from the heat of formation of sodium chloride. If we take as a qualitative reference the nominal energy required for the state change of water, 2.2 KJ/kg (a higher expense in a water state change system) is sufficient to adapt to any system based on the generation of working steam (water state change).

For open and closed steam turbine systems, working steam generation, Rankine cycles, combined cycles.

1 kg of reactants is equal to 1000/number of moles of NaCl.
Atomic weight of NaCl: 58.44 g/mol
1000 g/58.44 g/mol=17.11 mol/kg
17.11 mol/kg*411 KJ/mol=7032 KJ/kg NaCl
7032 KJ/kg>2.2 KJ/kg The potential of the Sodium-Chlorine reaction is significantly greater than the energy needed for the state change of water and its use as a working fluid.

Air-Based Exchange System (Heating)

The main advantage of the system applied to heating needs is the non-emission of polluting gases, and as a second comparative advantage, its possibilities for seasonal energy storage. A third characteristic is the production of sodium chloride as an industrial material for ice removal on public roads, being a byproduct of the boiler.

Heating systems based on the sodium-chlorine boiler have a body similar in all functional aspects to heat exchange boilers with fluids, with the only change in their surface, which will have an external heat dissipater system to maximize contact with air and its exchange with the environment.

Convection natural flow heat dissipation configurations will be vertically oriented to favor air convection along the boiler body, extending from the waste recovery container to the top of the cylinder.

Configurations with forced ventilation heat dissipation systems will be oriented in the direction of the airflow.

The calculation of the external surface and the amount of heat transmitted based on the heat contribution according to the boiler size and design needs is expressed in the formula for the amount of heat transmitted by convection:

$$Q = h_e * S * (t1-t2) \Delta°T$$

Q=heat lost or gained by convection
S=surface area
(t1−t2)=temperature difference between the surface and the fluid mass
$h_e$=convection coefficient
$\Delta°T$=time.

Heat Exchanger

Figure 6:
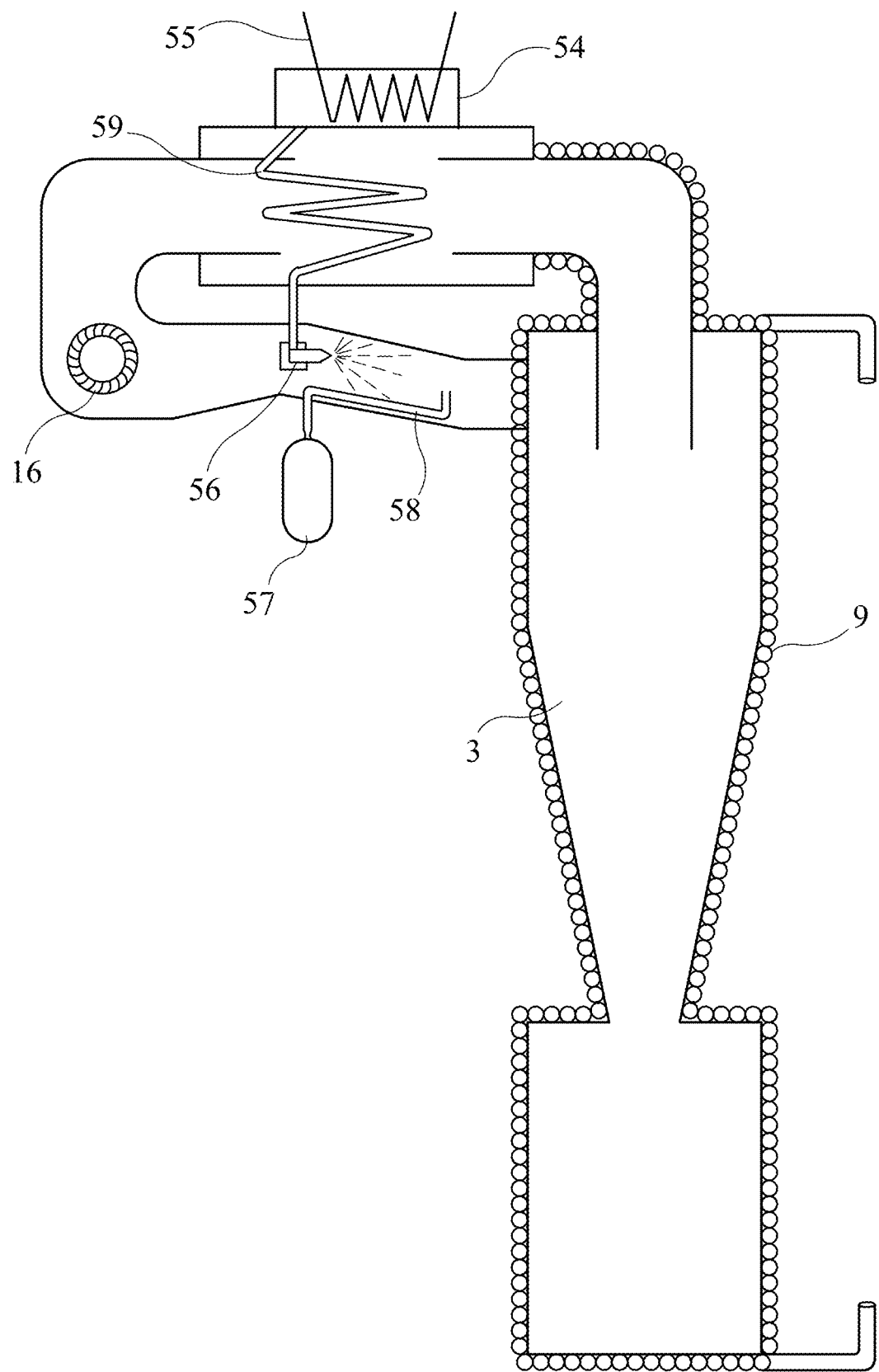
FIG. 6 is a diagrammatic view of a heat exchanger according to the invention.

FIG. 6 shows a preferred embodiment of a heat exchanger. A sodium container 54 provides sodium that is passed through a preheater 55 to a sodium injector 56. A chlorine gas supply 57 provides chlorine gas.

The sodium and chlorine mix in the combustion chamber 3, The combustion chamber 3 is clad with tubes 9 filled with working fluid passages.

A turbine 16 is connected to an outlet on a top of the combustion chamber 3.

A lower chamber 25 is connected to a bottom of the combustion chamber 3. Sodium chloride collects in the lower chamber 25.

Gas Diagram

Figure 7:
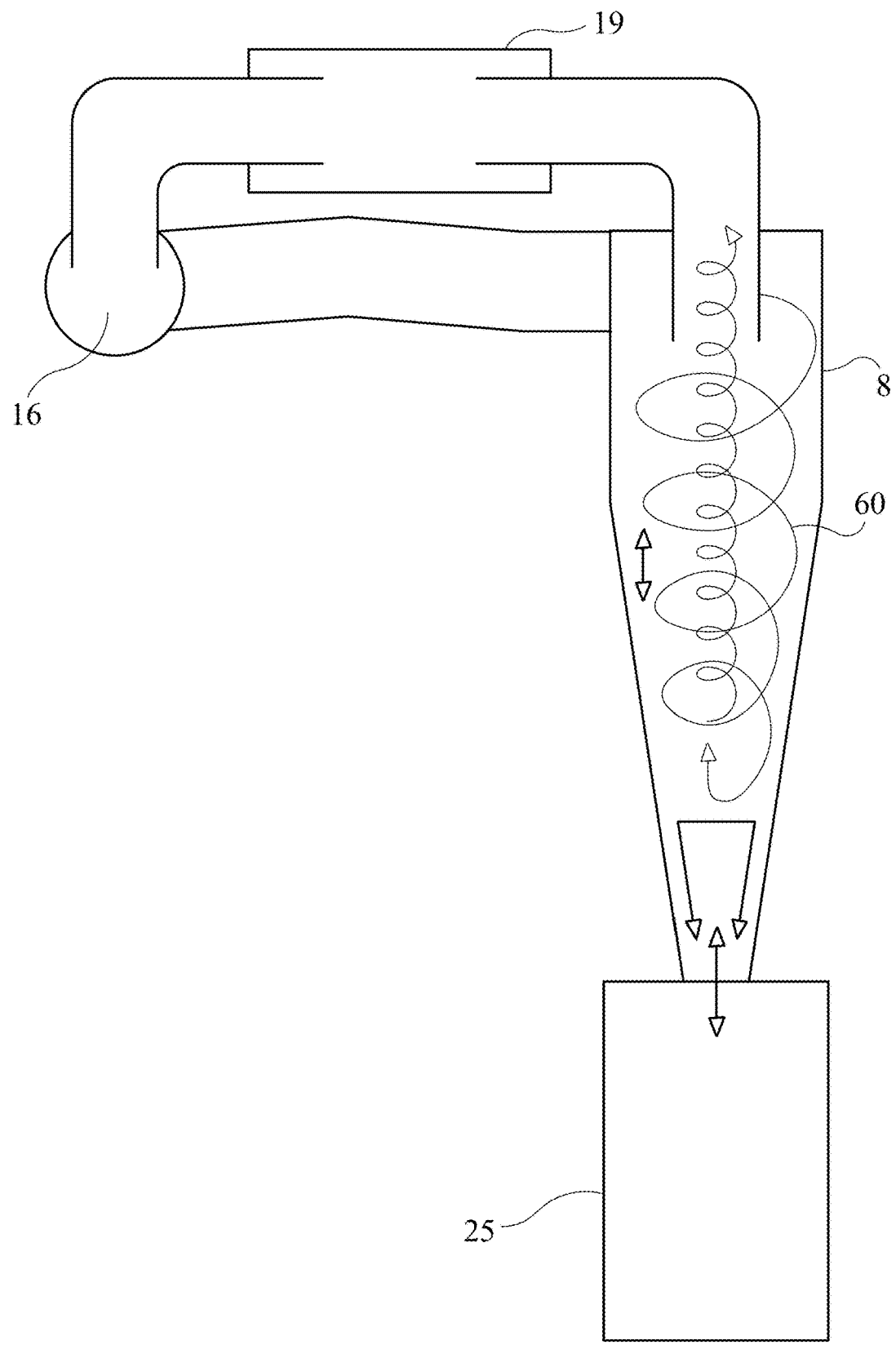
FIG. 7 is a gas flow diagram of the heat exchanger shown in FIG. 6.

FIG. 7 shows a gas diagram. The combustion chamber 3 includes a vortex 60. The combustion chamber 3 has a pressure drop ΔP<2488.16 pas. The gas speed vi is between 15.2 and 27.4 m/s. The saltation speed $v_x$ is the speed of the solid salt. The ratio of the gas speed to saltation speed is less than one and thirty-five hundredths ($v_i/v_x$<1.35). A lower chamber 25 is a closed container containing sodium chloride. A top of the combustion chamber 3 is connected to an upper chamber 19 is where a pressure change occurs that causes fine particles to separate. The upper chamber 19 connects to a turbine 16.

Discharge Vessel

Figure 8:
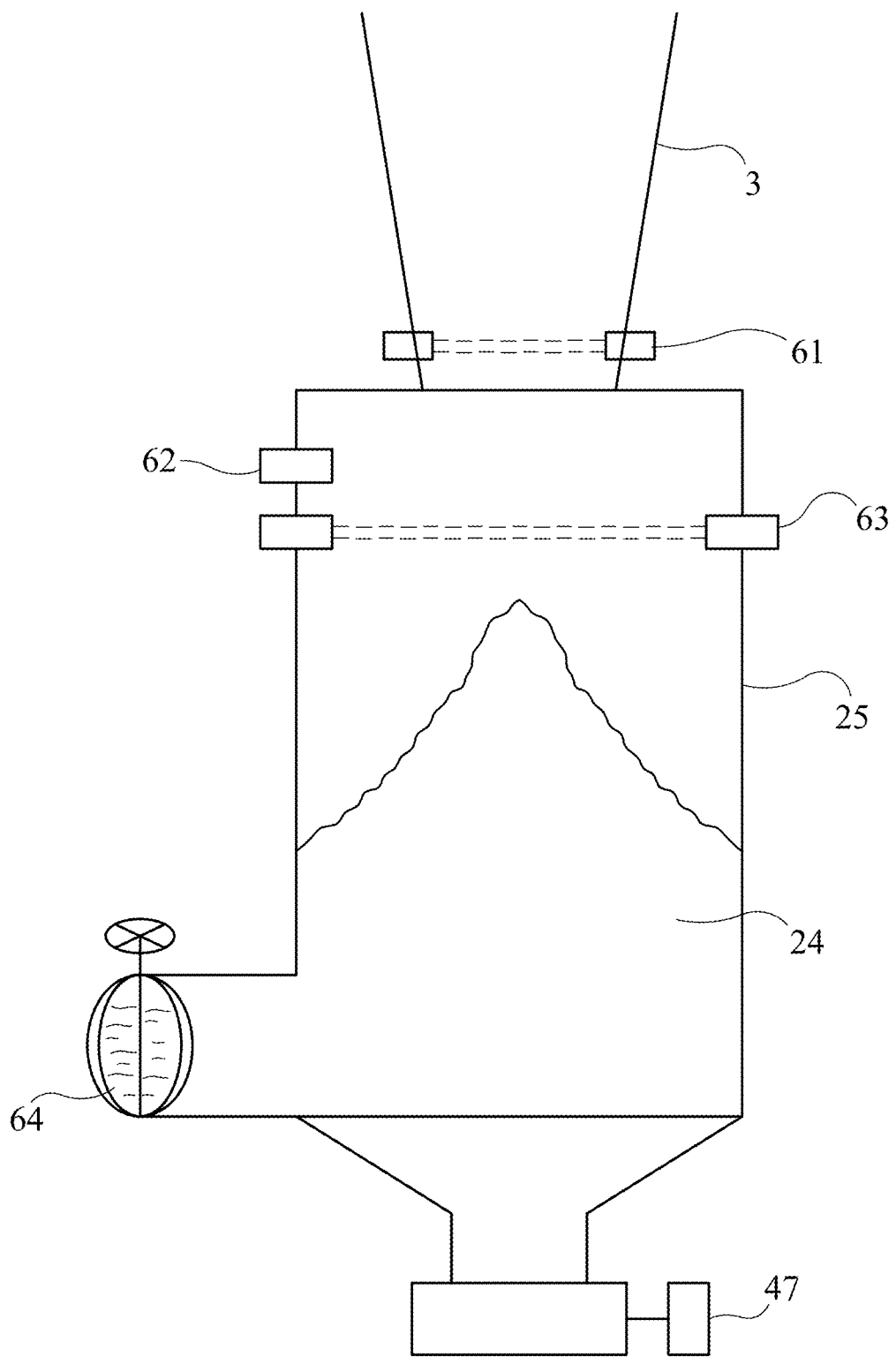
FIG. 8 is a diagrammatic view of a discharge vessel of sodium-chlorine reactor.

FIG. 8 shows a preferred embodiment of a discharge vessel. The discharge vessel includes a lower chamber 25. The lower chamber 25 is beneath a combustion chamber 3. A direction change sensor 61 is disposed between the combustion chamber 3 and the lower chamber 25. The direction change sensor 61 measures the directions of NaCl particles, to confirm that they are not returning to the cyclone. Solid sodium chloride 24. The combustion chamber 3 includes a pressure switch 62 and optical volume sensor 63. The pressure switch 62 is for WHAT? The optical volume sensor 63 measures WHAT? A salt outlet 47 is located at the bottom of the of lower chamber 25 for emptying the solid sodium chloride 25. The salt outlet 47 is controlled by computer. An auxiliary discharge valve 64 is included as a backup to the salt outlet 47.

Injector

Figure 9:
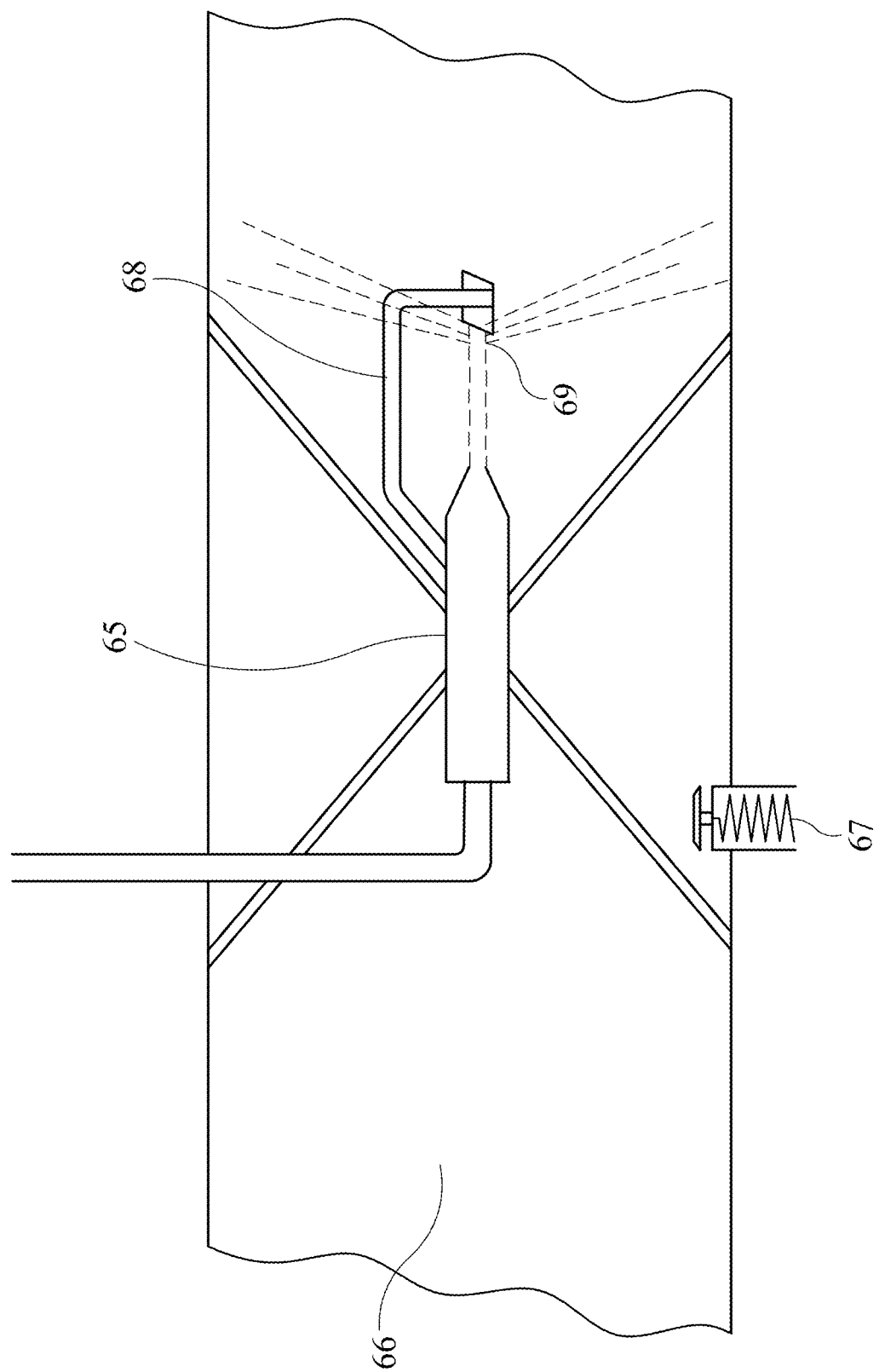
FIG. 9 is a closeup view of an injector used in a sodium-chlorine reactor.

FIG. 9 shows a preferred embodiment of the injector. A suspended injector 65 is disposed in a circulation duct 66. Liquid metallic sodium at a pressure greater than five hundred kilopascals (>500 kpasc) and less than one mega pascal (<1 Mpasc) is fed to the suspended injector 65. A gas inlet valve 67 is disposed in the circulation A lateral origin needle 68 is connected to the suspended injector 65. Sodium sprinkler 69 is generated by the lateral origin needle.

Relative Proportional Model

Figure 10:
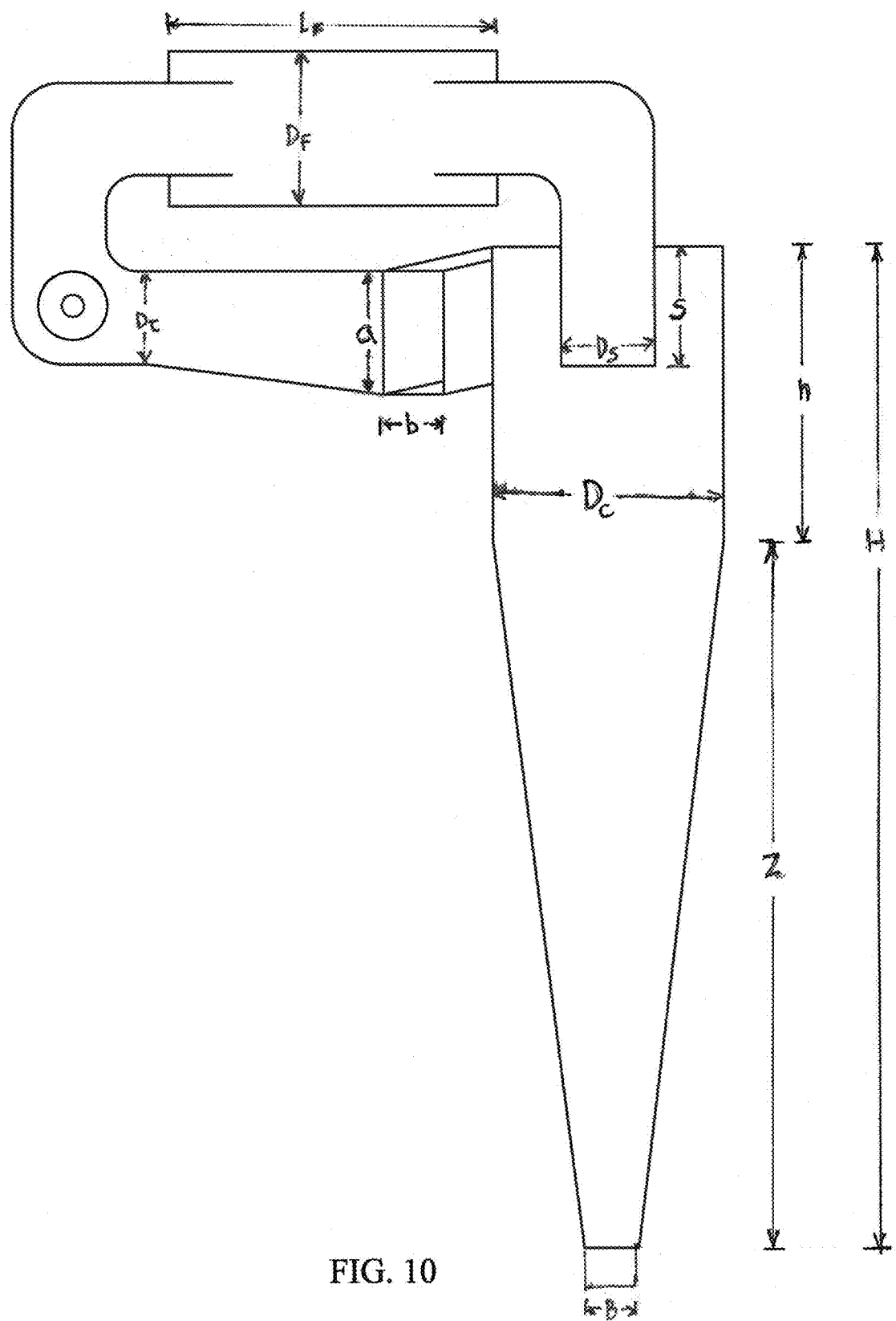
FIG. 10 is a diagrammatic view of a heat exchanger with dimensions marked thereon.

With reference to FIG. 10, the relative proportions of the combustion are provided as follows.

| PART | RATIO | VALUE |
| --- | --- | --- |
| Diameter cylinder main | $D_c/D_c$ | 1.0 |
| Inlet width | $b/D_c$ | 0.2 |
| Inlet height | $a/D_c$ | 0.5 |
| Outlet height | $s/D_c$ | 0.5 |
| Cylinder height | $h/D_c$ | 1.5 |
| Cone section height | $Z/D_c$ | 2.5 |
| Total height | $H/D_c$ | 4.0 |
| Solid outlet diameter | $B/D_c$ | 0.375 |
| Fine separator diameter | $D_F/D_C$ | 0.75 |
| Fine separator length | $L_F/D_C$ | 0.75 |
| Turbine outlet | $D_T/D_C$ | 0.4 |
| Number of vortices | $N_V$ | 5.5 |

Gas Flow, Pneumatics

Figure 11:
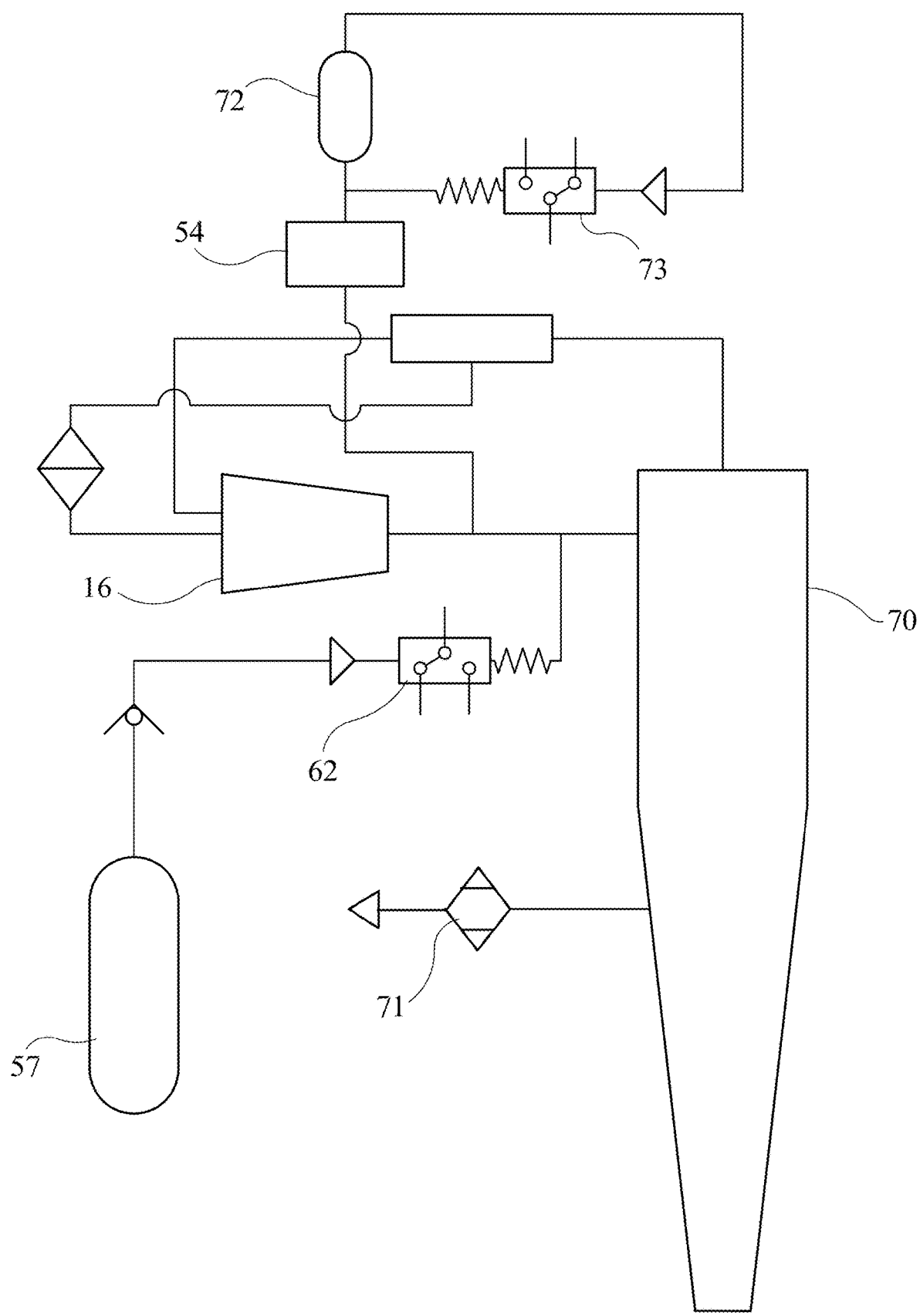
FIG. 11 is a diagrammatic view of the heat exchanger showing gas flow therein.

FIG. 11 shows a preferred embodiment of a reactor with a heat exchange cyclone 70. The heat exchange cyclone 70 has a lower frustoconical ("conical") lower section and a cylindrical upper section. A chlorine tank 57 supplies liquid chlorine ($Cl_2$). A pressure switch 62 regulates the pressure of chlorine gas in the heat exchange cyclone 70. A gas dryer 71 is connected to the conical section of the heat exchange cyclone 70. A sodium container 54 (also referred to as a sodium tank) holds liquid sodium to be supplied to the heat exchange cyclone 70. An argon tank 72 is connected to the sodium container 54. The release of argon gas from the argon tank 72 is controlled by a pressure switch 73.

Returnless Combustion Chamber

Figure 12:
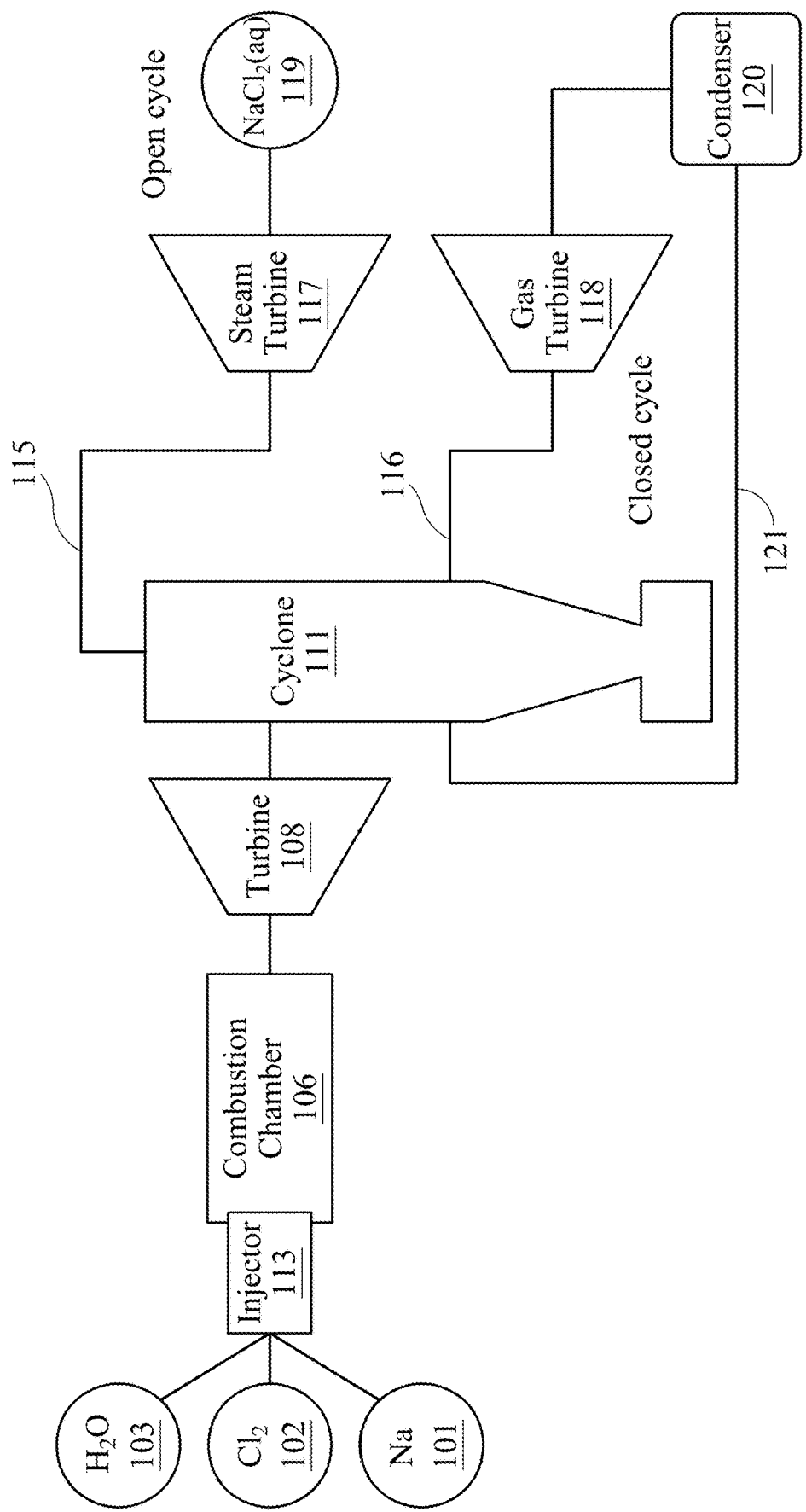
FIG. 12 is a schematic view of a sodium-chlorine generator without return according to the invention.
Figure 13:
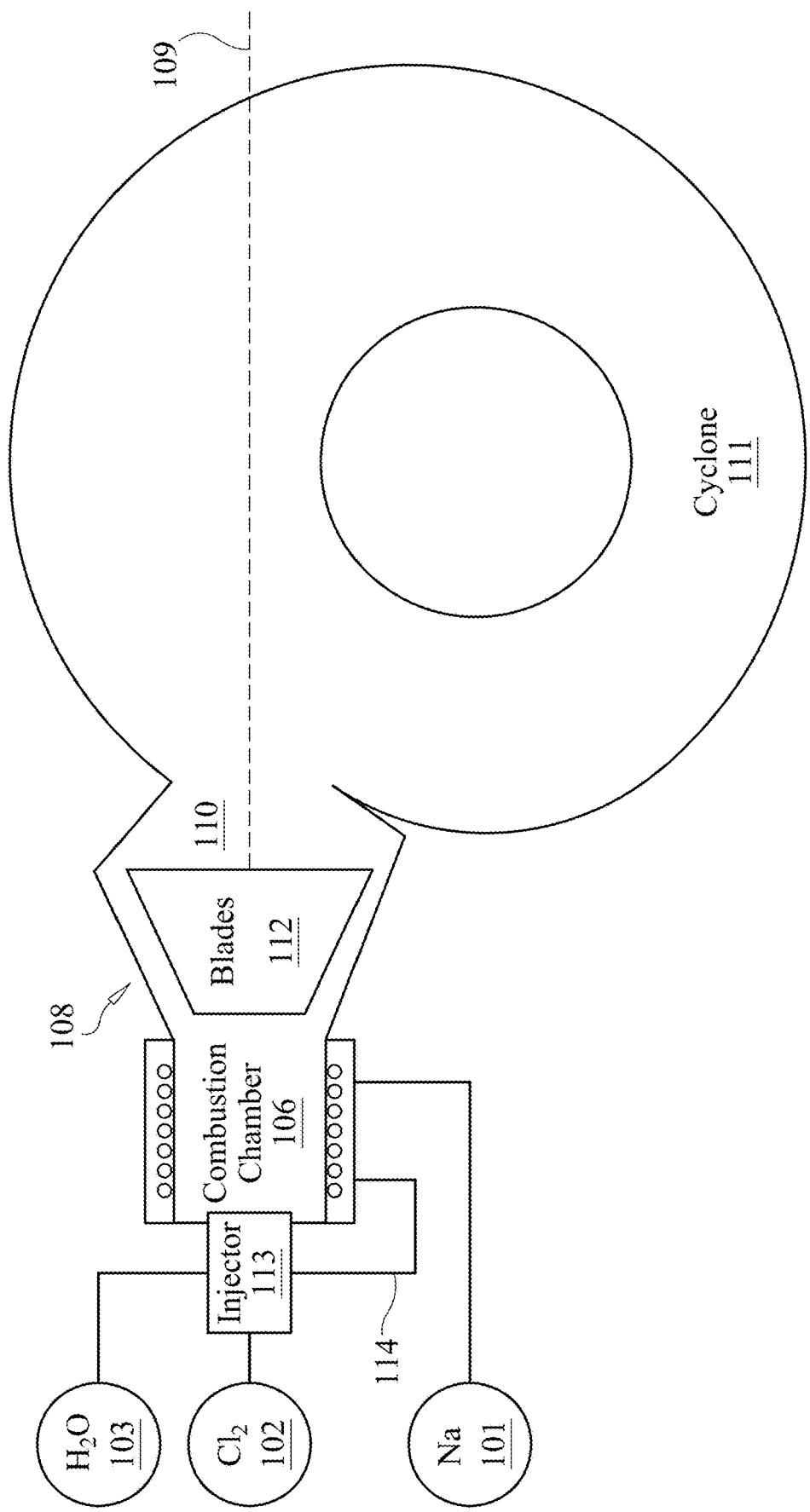
FIG. 13 is a top view of an embodiment of a sodium-chlorine generator with a convergent divergent nozzle.
Figure 14:
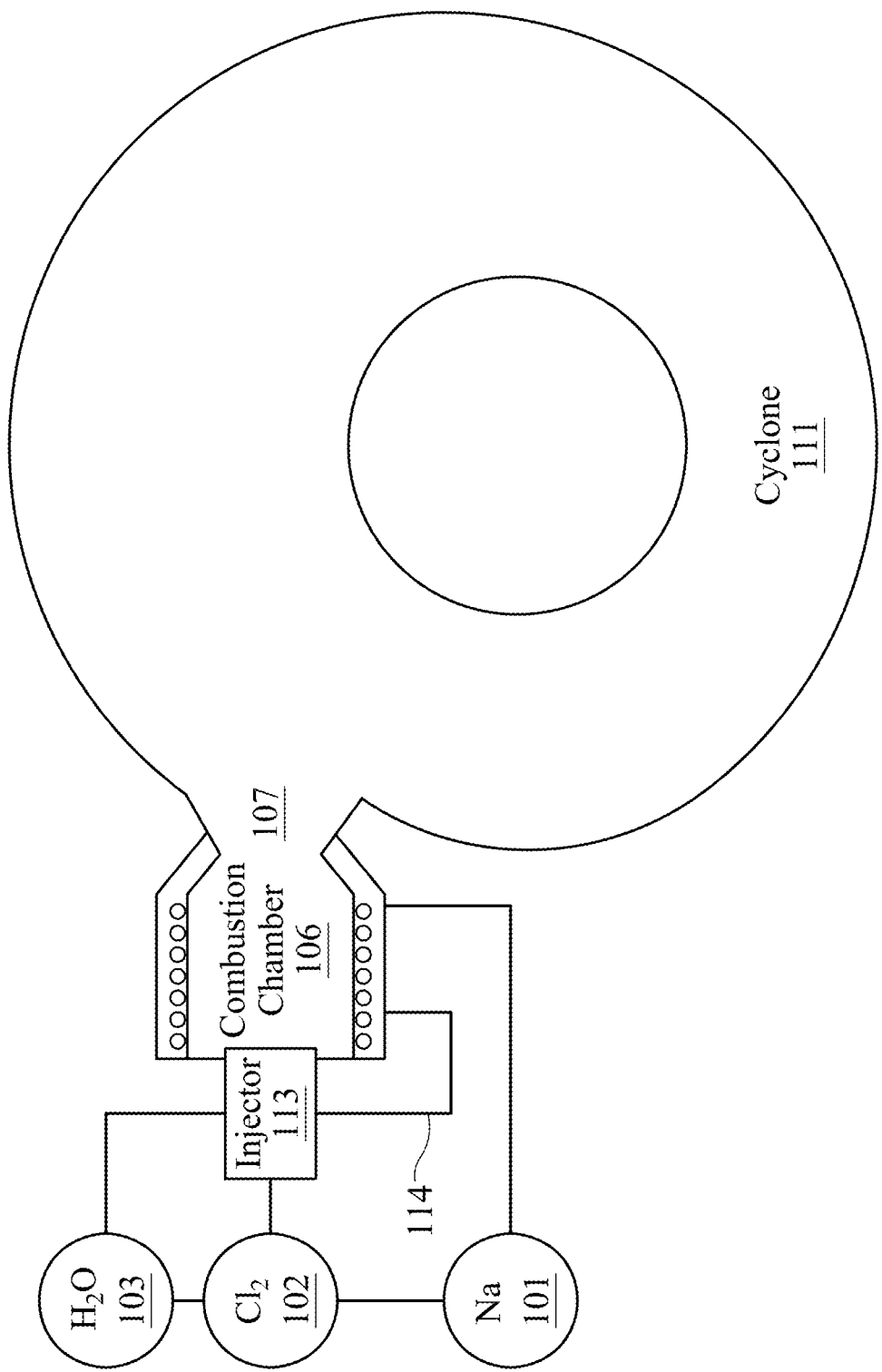
FIG. 14 is a top view of an embodiment of a sodium-chlorine generator with a coaxial turbine.

With reference to FIGS. 12-14, embodiments of a sodium-chlorine boiler obviate the need for a return in a combustion chamber. In the embodiments, sodium (Na(s)), chlorine ($Cl_{2(l)}$) are directly injected along with water ($H_2O_{(l)}$). The reaction of sodium and chlorine, in the presence of water, gives advantageous characteristics to the system.

The reaction becomes hypergolic and behaves according to the Arrhenius equation, which follows.

$$k = Ae^{\frac{-E_a}{RT}}$$

As the reaction speed increases and the change of state of the water towards superheated water vapor (i.e., superheated steam) increases, the energy can be transformed into work later through an axis 104.

The main reaction follows.

2Na+Cl$_2$→2NaCl

The following sub-reactions occur simultaneously from the incorporation of liquid water in the nozzle of the injector 105.

Na+H$_2$O→NaOH+H$^+$

H$_2$O+Cl→HCl+OH$^-$

HCl+NaOH→H$_2$O+NaCl

The final products are entirely stable molecules of water and sodium chloride. When water and sodium chloride leave the Chamber, they are harmless to the environment.

The combustion chamber includes a regenerative system 114.

A steam conduit 115 carries steam from the cyclonic separator 115 to the steam turbine 117. In the open system, aqueous sodium chloride 119 is output from the steam turbine 117.

In a closed cycle, gas conduit 116 carries heated gas to a gas turbine 118. From the gas turbine 118, the heated gas is cooled in a condenser 120, and the cooled gas is brough to the cyclonic separator 111 by the return 121.

The combustion chamber 106 can be of two different embodiments in the returnless combustion chamber variant.
Convergent Divergent FIG. 14 shows the convergent divergent embodiment with which the maximum production of water vapor is sought with a high temperature greater than five-hundred degrees centigrade (>500° C.) and pressure greater than forty and less than 60 atmospheres (40 atm<p<60 atm), which is calculated based on the criteria of a convergent divergent system, Mach number <1 to avoid supersonic shock waves inside the combustion chamber, material limit (melting point, coefficient of elasticity and plasticity) higher than the operating temperature of both the combustion chamber and the regenerative sodium metallic system adhered to the external walls of the chamber 106.

The expansion of the water vapor mixture and sodium chloride in the divergent section of the chamber 106, i.e., the nozzle 107, presents expansion according to the ideal gas equation, which is shown below.

$$pV=nRT$$

The reactant's pressure decreases and its volume increases causing a decrease in temperature, which, as a rule, should not be lower than the superheated steam curve, always avoiding approaches to the dew point because the crystallization of sodium chloride is essential for the sodium chloride's separation from the superheated steam and the sodium chloride's decantation in the cyclonic separator 111.
Combustion Chamber with Axial Rotor Gas Turbine FIG. 13 shows an embodiment having a combustion chamber with an axial rotor gas turbine. In the embodiment, a system including a shaft 109 and axial rotors are incorporated prior to a diffuser 110 and subsequently the expansion of the superheated steam occurs in the cyclonic separator 111. The design criteria of this configuration require subsonic speeds at the tip of the blades 112 and a diffuser 110 in the transition to the cyclone in order to avoid the separation of sodium chloride crystals by expansion of the steam inside the turbine since the absence of free solid particles larger than twenty microns (>20μ) in contact is essential with turbine blades.
Compressors and Injection Pumps For the purposes of the injection of liquid sodium and water, injection pumps 113 standardized for the specific density of both are used. In addition, the injection pumps 113 maintain a nominal pressure greater than that of the combustion chamber.
Pump Pressure>Combustion Chamber Pressure For the purposes of the gaseous chlorine compressor, a cryogenic pumping system is preferably used since the pressure in the chamber is greater than the pressure of the chlorine liquefaction and to avoid pressure return from the chamber to the pumping system. Preferably, chlorine in a liquid state is used to avoid the chlorine's evaporation in the pumping system and in the regenerative heat exchange system of the combustion chamber.

An injector 113 is connected to the chlorine supply 102 and water supply 103 and pressurizes the water and chorine for injection into the combustion chamber 106.

The regenerative system 114 on the outside of both combustion chambers is used for two specific purposes. The first purpose is to prevent the temperature limit of the chamber materials from limiting the working pressure of the expanding fluid. The second purpose is to maintain the sodium in a liquid state for its operation as a fluid.

What is claimed is:

1. A sodium-chlorine boiler for generating electricity, comprising:
    a chlorine supply providing chlorine;
    a sodium metal supply providing sodium metal;
    a water supply providing water; and
    a combustion chamber receiving said chlorine from said chlorine supply, said sodium metal from said sodium metal supply, and said water from said water supply, said chlorine, said sodium metal, and said water combining in a reaction in said combustion chamber, the reaction yielding heat, steam, and sodium chloride.

2. The sodium-chlorine boiler according to claim 1, further comprising:
    a turbine being connected downstream from said combustion chamber, said turbine being turned by the steam from said combustion chamber.

3. The sodium-chlorine boiler according to claim 2, further comprising a cyclonic separator disposed downstream said turbine, said cyclonic separator separating the sodium chloride from the steam.

4. The sodium-chlorine boiler according to claim 3, further comprising a diffuser disposed between said turbine and said cyclonic separator.

5. The sodium-chlorine boiler according to claim 2, wherein said combustion chamber and said turbine are coaxial.

6. The sodium-chlorine boiler according to claim 1, wherein said combustion chamber has a convergent divergent nozzle for releasing the steam and the sodium chloride from said combustion chamber.

7. The sodium-chlorine boiler according to claim 6, wherein said nozzle is configured to superheat the steam to at least five hundred degrees Celsius when passing through said nozzle.

8. The sodium-chlorine boiler according to claim 6, wherein said nozzle is configured to pressurize the steam in the combustion chamber to at least forty atmospheres when the reaction is normally occurring.

9. The sodium-chlorine boiler according to claim 8, wherein said nozzle is configured to pressurize the steam in the combustion chamber to no greater than sixty atmospheres when the reaction is normally occurring.

10. The sodium-chlorine boiler according to claim 1, wherein said chlorine supply includes a cryogenic pump, said cryogenic pump holding the chlorine as a liquid in said chlorine supply.

\* \* \* \* \*